United States Patent [19]

Presley

[11] 4,192,189

[45] Mar. 11, 1980

[54] RATE SENSOR

[75] Inventor: Rex W. Presley, Livonia, Mich.

[73] Assignee: The Bendix Corporation, Southfield, Mich.

[21] Appl. No.: 947,387

[22] Filed: Oct. 2, 1978

[51] Int. Cl.$^2$ ............................................. G01P 15/00
[52] U.S. Cl. ...................................................... 73/505
[58] Field of Search ................. 73/505, 516 R, 517 A, 73/517 A, 517 B; 308/10

[56] References Cited

U.S. PATENT DOCUMENTS

| | | | |
|---|---|---|---|
| 2,942,479 | 6/1960 | Hollmann | 73/505 X |
| 3,488,531 | 1/1970 | Rosensweig | 308/10 X |
| 4,047,439 | 9/1977 | Russell et al. | 73/517 B X |

*Primary Examiner*—Jerry W. Myracle
*Attorney, Agent, or Firm*—James R. Ignatowski; R. C. Wells

[57] ABSTRACT

A rate sensor is disclosd for use in applications requiring high reliability such as in aircraft or tank gun stabilization systems. The rate sensor consists of a sensor rotor supported within a volume of magnetic fluid contained in a sensor housing to which is applied a magnetic field, levitating the sensor rotor in a central location within the housing cavity. A plurality of sensor means are provided positioned about the axis of the sensor rotor detecting the relative movement between the sensor rotor and the sensor housing occurring upon rotation of the housing from which an output signal corresponding to the rate of change of rotation of the housing. The magnetic field is produced either by a series of permanent magnets arranged about the housing, by the sensor mass formed with permanently magnetized portions, or by a series of electromagnets which may also function in a closed-loop stabiization system to more accurately maintain the central position of the sensor mass in the housing and provide a variable damping of the rotor.

13 Claims, 6 Drawing Figures

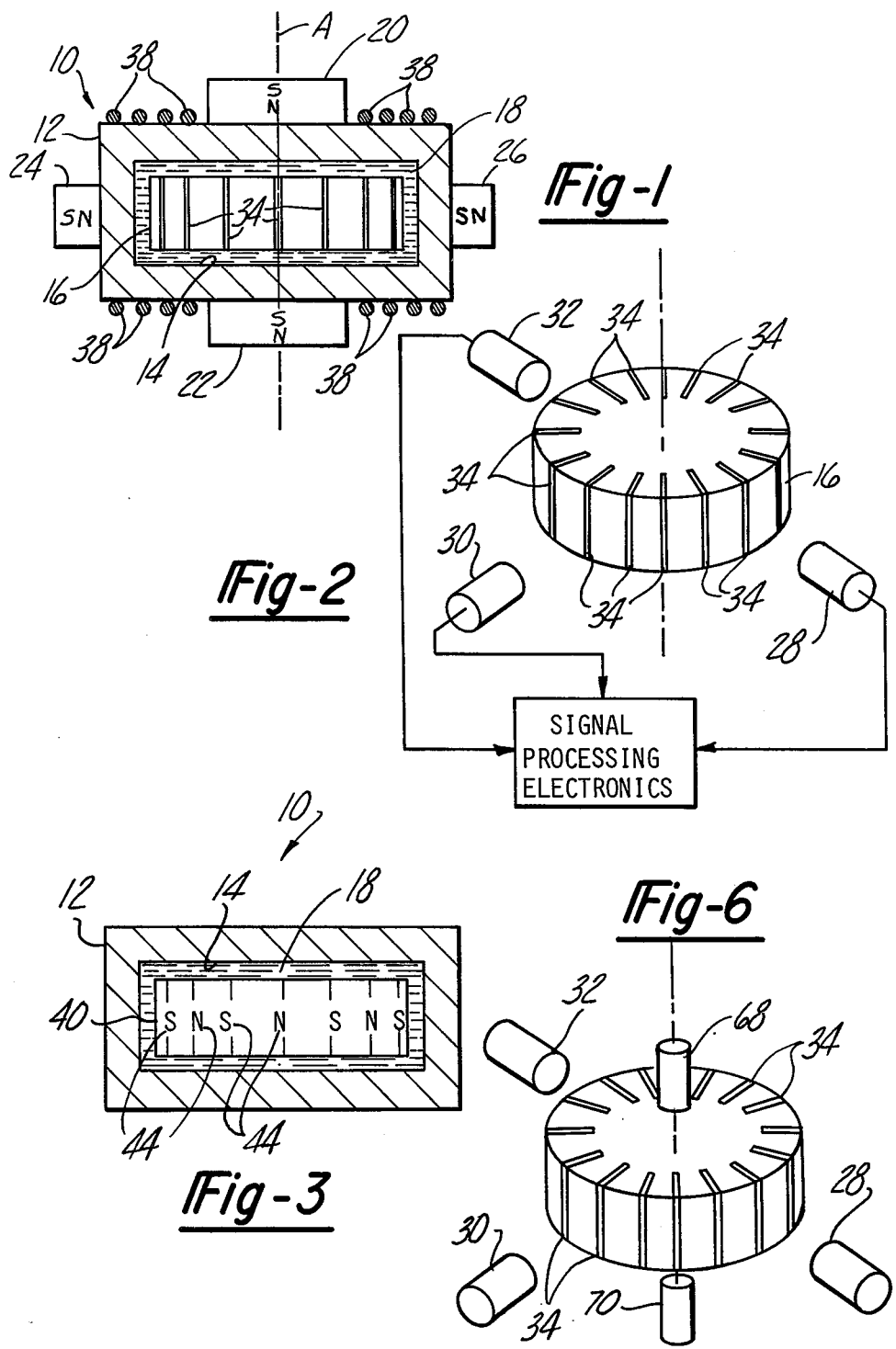

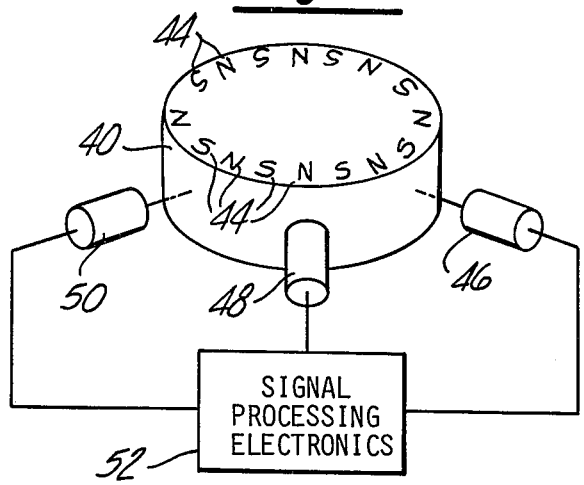
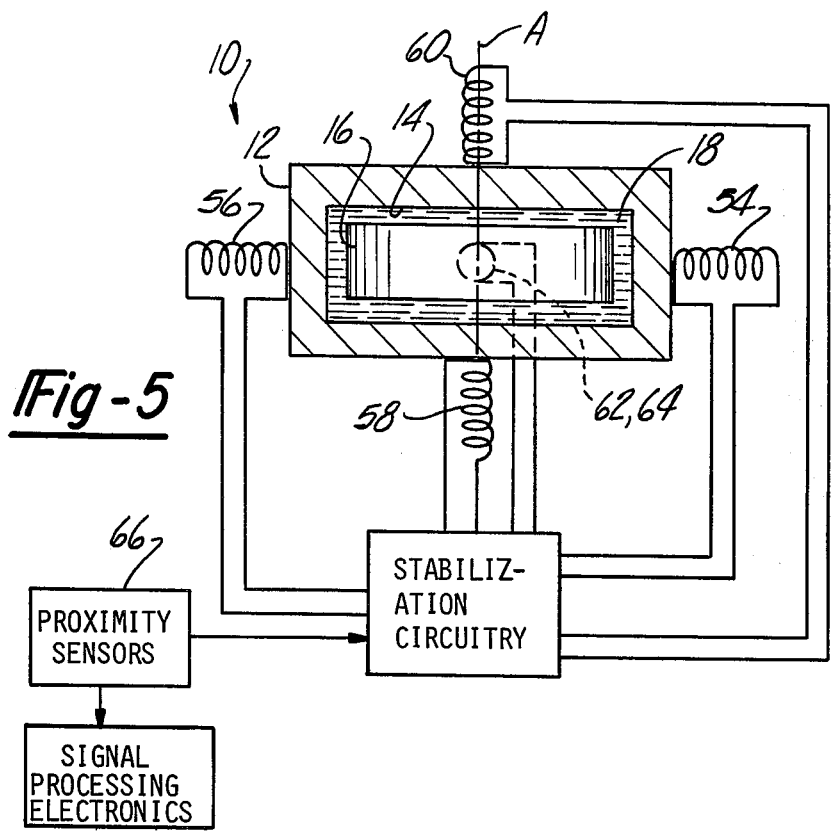

RATE SENSOR

BACKGROUND DISCUSSION

Conventional rate sensors employed for such applications as aircraft stabilization systems and tank gun stabilization systems are typically provided by gyroscopes in which a rotor is rotated at a relatively high angular velocity. Upon rotation of the gyroscope mounted to the structure, the gyroscopic forces created by rotation of the rotor are utilized to generate output signals corresponding to the angular rate of rotation of the structure to which the gyroscope is mounted. While providing satisfactory performance under ideal conditions, the presence of the rotating mass and the relative delicacy of the gyroscope have resulted in poor reliability of such systems under adverse conditions as are encountered by armored vehicles in the field or high performance aircraft executing severe maneuvers.

Accordingly, the reliability of such systems could be improved if a rate sensor could be provided which did not involve complex and delicate rotating parts and which rate sensor was not vulnerable to shock or impact loading.

It is accordingly the object of the present invention to provide such a rate sensor which does not require a rotating mass, which is simple and reliable, and which is highly resistant to the effects of shock loadings imposed thereon.

SUMMARY OF THE INVENTION

This and other objects of the present invention, which will become apparent upon a reading of the following specification and claims, are achieved by a rate sensor consisting of a sensor rotor disposed in a volume of magnetic fluid contained within a cavity in a sensor housing. The magnetic field is applied to the magnetic fluid such as to suspend the sensor mass centrally within the cavity in the sensor housing. Rotation of the sensor housing about the rotor axis and the frictionless support of the rotor results in relative rotation between the sensor housing and the sensor rotor. The relative rotation is sensed by sensor means with the sensor means output signals processed to provide an output signal indicative of the angular rate of movement of the sensor housing about the rotor axis. The magnetic field may be established by pairs of permanent magnets or electromagnets positioned exteriorly of the sensor housing about the orthogonal axes passing through the rotor or, alternatively, the sensor rotor may include magnetized portions alternating in polarity about the rotor periphery.

Those embodiments in which electromagnetic coils are utilized to establish the magnetic field and the stabilization circuits may be incorporated in conjunction with the position sensors to more accurately maintain the positioning of the sensor mass in the housing and/or to vary the damping forces with the displacement of the sensor rotor by varying the power supplied to the electromagnets with sensed displacement of the rotor.

DESCRIPTION OF THE DRAWINGS

FIG. 1 is a side elevational view of a sensor according to the present invention, depicted in partial section.

FIG. 2 is a perspective view of the sensor mass in relationship with the proximity sensors associated therewith, together with a diagrammatic representation of the signal processing electronics.

FIG. 3 is a side elevational view in partial section of a second embodiment of a rate sensor according to the present invention.

FIG. 4 is a perspective view of the sensor mass incorporated in the rate sensor depicted in FIG. 2 and the associated field sensors together with the diagrammatic representation of the signal processing electronics.

FIG. 5 is a side elevational view in partial section of a third embodiment of a rate sensor according to the present invention together with a diagrammatic representation of the associated stabilization control system.

FIG. 6 is a perspective view of a sensor rotor and displacement sensors of yet another embodiment of the rate sensor according to the present invention with a diagrammatic representation of the associated signal processing electronics.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

According to the concept of the present invention, an essentially frictionless support for a sensor mass is provided which functions in a highly reliable fashion, such that a stationary sensor mass can be utilized to sense a housing relative rotation between a sensor housing supporting the sensor mass to allow the generation of a signal corresponding to the rate of angular movement of the sensor housing.

According to the present invention, this result is achieved by levitation of the sensor mass in a volume of magnetic or ferro fluid contained in a cavity formed in the sensor housing. This is achieved by means of a magnetic field applied to the magnetic fluid, creating pressure forces resulting in the suspension of the sensor mass in the magnetic fluid. The suspension of the sensor mass in the fluid comprises an essentially frictionless support for the sensor mass such that the relative rotation between the sensor housing and the sensor mass can be sensed from which can be generated a signal corresponding to the angular rate of movement of the sensor housing.

This arrangement is depicted in FIGS. 1 and 2.

The rate sensor 10 includes a sensor housing 12 constructed of a nonmagnetic material and having an internal cavity 14 within which is suspended a sensor mass comprised of a sensor rotor 16. The sensor rotor 16 is of a lesser volume than that of the cavity 14 and filling the remainder of the cavity 14 is a volume of magnetic or ferro fluid indicated at 18. Magnetic or ferro fluid is of a known type which includes a liquid such as oil in which is disposed a colloidal suspension of submicron-sized particles, with a dispersing agent added.

Suitable such material is available from Ferro Fluids Corporation of Burlington, Massachusetts and a detailed description of the characteristics of such material is disclosed in ASME Paper No. 74-DE-5, entitled "Designing with Ferro Fluids".

Upon the imposition of a magnetic field on the fluid, it will act to generate pressure forces which may be used to counteract the weight of the sensor rotor 16 such as to levitate the same within the cavity 14 without touching any of the interior surfaces of the opening, such that an essentially friction-free support for the sensor rotor 16 is provided.

The establishment of such a magnetic field may be accomplished by the disposition of three pairs of permanent magnets mounted along each of the orthogonal axes extending through the sensor rotor 16. These include permanent magnet pairs 20 and 22 on either side of the sensor housing 12 aligned with the axis A about which the angular rate of movement is to be sensed. A second set of permanent magnets 24 and 26 are also provided to provide the central location of the sensor rotor 16 along the transverse axis to the axis A of the sensor. Additional permanent magnets (not shown) will be placed on the second orthogonal axis transverse to the rate sensor axis A.

The resulting magnetic field created within the cavity 14 will act on the magnetic fluid volume 18 such as to stabilize the position of the mass at a central point within the cavity 14.

The sensor rotor 16, in this embodiment, is constructed of a nonmagnetic material such as a molded plastic (FIG. 2).

In order to determine the relative angular position of the sensor housing 12 and the sensor rotor 16, a plurality of displacement sensing means are provided, such as proximity sensors 28, 30 and 32 located at circumferentially-spaced locations about the periphery of the sensor rotor 16. In addition, a plurality of detector elements comprised of metallic strips 34 of a nonmagnetic material are disposed equispaced about the periphery of the sensor rotor 16, with the proximity sensors 28, 30 and 32 sensing the movement of each of the metallic strips 34 past a respective one of the proximity sensors.

Each of the sensors 28, 30 and 32 are located so as to be phase-shifted with respect to the relative positioning of the metallic strips 34 such that with relative movement of the sensor rotor 16 and the sensor housing 12 mounting the proximity sensors 28, 30 and 32.

The respective sensors successively generate a signal as each of the metallic strips 34 move past the respective sensor.

This enables the determination of the direction of rotation by determining if the signal generated by the proximity sensor 30, for example, leads the sensor generator by proximity sensor 28, or whether the proximity sensor 32 leads the generation of the signal by proximity sensor 30.

The displacement signals generated by the respective sensors 28, 30 and 32 are then processed in suitable signal processing electronics as indicated by the block diagram representation 36.

The pulse signals generated could be digital in form, in which case the number of pulses received from the proximity sensors 28, 30 and 32 are measured per unit time, with the rate of pulse generation providing a signal corresponding to the relative rate of rotation of the sensor rotor 16 and the sensor housing 12 to thereby indicate the rate of rotation of the structure to which the sensor housing 12 is mounted about the axis A.

The proximity sensors 28, 30 and 32 could also be operated in analog mode, each with a sinusoidal output with the signals differentiated, rectified and added to give an analog rate signal.

To insure that the magnetic fluid 18 does not congeal at extremely low temperatures, heating element windings 38 may also be provided to warm the sensor housing 12 and thus insure that the magnetic fluid 18 remains in a liquid condition.

Among the major considerations in the design of the rate sensor 10 and the various design parameters are to insure a sufficient damping of the movement of the sensor rotor 16 to eliminate oscillations relative the sensor housing 12 and sensor rotor 16.

At the same time, the viscous forces must be related to the inertia of the sensor rotor 16 such that the sensor rotor 16 will remain essentially stationary at angular rates in the ranges to be measured.

Also, the behavior of the magnetic fluid 18 under the influence of the magnetic field, while tending to center the sensor rotor 16 in the cavity 14, cannot entirely resist accelerations induced by vibration and shock. Thus, the clearance between the interior surfaces of the cavity 14 and the sensor rotor 16 in the central position should be such as to accommodate the expected shock and vibration loads encountered without contact.

These factors may be determined and reconciled by the following analysis:

When the case is rotated, the fluid viscosity results in a torque to act on the sensing means, which is given by:

$$T = F(\dot{\theta}_i - \dot{\theta}_m)$$

Where
 $F = 2\pi\mu r^3 L/h$ viscous force coefficient
 h = clearance—inches
 L = length—inches
 r = radius—inches
 $\mu$ = viscosity—lb sec/in
 $\dot{\theta}_i$ = input rate—rad/sec
 $\dot{\theta}_m$ = sensing mass rate—rad/sec The sensing mass acceleration is $$J\ddot{\theta}_m = T = F(\dot{\theta}_i - \dot{\theta}_m)$$

Where J = the moment of inertia of the sensor rotor.

From these two separate equations, it can be seen that the angular rate above which the housing will remain essentially stationary is proportional to the ratio of the viscous force coefficient F and the moment of inertia J of the sensor rotor 16.

The force balance equation for the sensor rotor 16 with linear acceleration applied to the sensor housing 12 is:

$$M\ddot{Y}_m = K_p A(Y_c - Y_m) + K_v(\dot{Y}_c - \dot{Y}_m)$$

Where
 A = projected surface area of sensing mass—in
 $K_p$ = pressure gradient resulting from magnetic field—psid/in
 $K_v$ = viscous damping coefficient—lb sec/in
 M = mass—lb sec/in
 $Y_c$ = displacement of case—in
 $Y_m$ = displacement of sensing mass—in The magnetic field may also be established by the construction of the sensor rotor 16 as a permanent magnet, as depicted in FIGS. 3 and 4. In this version, the sensor rotor 40 is constructed of a magnetic material which has magnetized portions with north and south polar patterns extending about its periphery, as indicated in FIGS. 3 and 4. The north and south zones 42 and 44 alternate about the periphery.

In this case, the displacement sensors 46, 48 and 50 may be of the magnetic field sensor type, i.e., a coil, Hall effect, or a Weigand type magnetic sensor to detect the relative rotation to provide means for detecting the relative rotation between the nonmagnetic sensor housing 12 and the magnetic sensor rotor 40.

The processing electronics 52 combine and process signals as in the embodiment depicted in FIGS. 1 and 2.

The magnetic field established by the magnetic sensor rotor 40 in the magnetic fluid 18 which occupies the clearance spaces in the cavity 14 will serve to centrally position the sensor rotor 40 within the cavity 14 as in the above-described embodiment.

As indicated above, the magnetic field may be established by the use of permanent or electromagnets. The use of electromagnets is depicted in FIG. 5. This arrangement introduces further complexity, but offers several advantages.

The sensor housing 12, as before, contains the sensor rotor 16 within a cavity 14 disposed within the interior of the sensor housing 12, with a volume of magnetic fluid 18 disposed in the cavity 14.

In this version, pairs of magnetic coils 54, 56, 58, 60, 62 and 64 are located about respective orthogonal axes of the sensor housing 12.

Each of the coils 54 through 64 are adapted to be energized by a stabilization circuitry indicated in block diagrammatic form in FIG. 5.

The stabilization circuitry acts to energize each of the coils 54 through 64 to create a magnetic field about each of the orthogonal axes. The stabilization circuitry can form a closed loop system with signals from the proximity sensors indicated diagrammatically, whereby the sensor rotor 16 may be more accurately positioned in the central position by increasing the power to a given coil when the sensor rotor 16 is mispositioned within the cavity 14.

In addition, the variable damping may be introduced by an increase in the power level applied to each of the coils 54 through 64, increasing the viscosity of the magnetic liquid 18, to in turn increase the damping force. This is related to the displacement of the sensor rotor with the signals received from the proximity sensor 66 processed in the signal processing electronics.

As depicted in FIG. 6, the rate sensor may be combined with displacement sensors in addition to sensors 28, 30 and 32. These additional sensors 68 and 70 may be provided aligned transverse or parallel to the axis A about the rotation in order to generate at the same time rotational rate sensor signals as well as linear acceleration signals, which may be processed in common signal processing electronics as indicated in FIG. 6 to provide linear acceleration signals and linear stabilization of the sensor rotor 16 in the cavity 14.

Accordingly, it can be seen that an extremely rugged and reliable rate sensor has been provided which performs in a much more reliable manner than the current gyroscopic rate sensors, so as to improve the performance of such systems as tank gun and aircraft stabilization systems.

The configuration of the rate sensor is extremely simple to enable it to be manufactured at relatively low cost.

The embodiments of the invention in which an exclusive property or privilege is claimed are defined as follows:

1. A rate sensor comprising:
   a nonmagnetic sensor housing having an internal cavity formed therein;
   a sensor rotor having an axis of rotation disposed in said cavity and occupying less than the full volume of said cavity;
   a volume of magnetic fluid filling the space in said cavity between said rate sensor rotor and said housing;
   means for applying a magnetic field to said volume of magnetic fluid to levitate said sensor rotor in said cavity;
   sensor means for generating signals corresponding to the angle of relative rotation between said sensor housing and said sensor rotor about the axis of said rate sensor rotor;
   means responsive to said signals for generating a signal corresponding to the rate of angular rotation of said sensor housing;
   whereby the rate of angular movement of said sensor housing may be determined.

2. The rate sensor according to claim 1 wherein said means for creating said magnetic field comprises a plurality of permanent magnets mounted to said sensor housing, including pairs of permanent magnets positioned on either side of said rotor along the orthogonal axes passing through said sensor rotor.

3. The rate sensor according to claim 2 wherein said sensor means includes a plurality of displacement sensors disposed about the circumference of said sensor rotor and wherein said rate sensor rotor is formed with a series of detector elements spaced about the periphery of said sensor rotor.

4. The rate sensor according to claim 3 wherein said sensor means are positioned circumferentially in a phase-shifted position with respect to each other and with respect to said detector elements mounted to said sensor rotor periphery, whereby the direction of said relative rotation between said rate sensor housing and said rate sensor rotor may be determined by the phase relationship between the signals generated by each of said plurality of displacement sensor means.

5. The rate sensor according to claim 1 wherein said means for establishing said magnetic field comprises permanent magnetic portions formed about the periphery of said sensor rotor in alternating polar relationships.

6. The rate sensor according to claim 5 wherein said sensor means comprises magnetic detector means positioned about the periphery of said rotor detecting said relative movement of said permanently magnetized portions of said rotor passing each of said plurality of magnetic detector means.

7. The rate sensor according to claim 6 wherein said sensor means are positioned circumferentially in a phase-shifted position with respect to each other and with respect to said detector elements mounted to said sensor rotor periphery, whereby the direction of said relative rotation between said rate sensor housing and said rate sensor rotor may be determined by the phase relationship between the signals generated by each of said plurality of displacement sensor means.

8. The rate sensor according to claim 1 wherein said means for establishing said magnetic field comprises pairs of electromagnets positioned on either side of said rate sensor rotor about the orthogonal axes passing through said sensor rotor.

9. The rate sensor according to claim 8 wherein said rate sensor further includes means for increasing the power level applied to said electromagnets in correspondence with the sensed relative displacement between said sensor rotor and said rate sensor housing, whereby the viscous damping force exerted by said magnetic fluid is increased with increasing displacement.

10. The rate sensor according to claim 9 wherein said sensor means includes a plurality of displacement sensors disposed about the circumference of said sensor rotor and wherein said rate sensor rotor is formed with a series of detector elements spaced about the periphery of said sensor rotor.

11. The rate sensor according to claim 10 further including proximity detector means positioned along said axis of said sensor rotor, and means responsive to sensed linear movement along said axis to increase the power level to one of said electromagnets to center said sensor rotor in said cavity.

12. The rate sensor according to claim 11 further including means responsive to said proximity sensor for generating signals corresponding to the linear accelerations applied to said sensor rotor.

13. The rate sensor according to claim 10 wherein said sensor means are positioned circumferentially in a phase-shifted position with respect to each other and with respect to said detector elements mounted to said sensor rotor periphery, whereby the direction of said relative rotation between said rate sensor housing and said rate sensor rotor may be determined by the phase relationship between the signals generated by each of said plurality of displacement sensor means.

* * * * *